United States Patent
Mangold

[19]

[11] Patent Number: 5,934,819
[45] Date of Patent: *Aug. 10, 1999

[54] BOLTED CONNECTION FOR CONNECTING TWO PROFILES

[76] Inventor: Andreas Mangold, Schulgasse 4, Biel-Benken, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,161

[22] Filed: May 14, 1997

[30] Foreign Application Priority Data

May 28, 1996 [CH] Switzerland .............................. 1330/96

[51] Int. Cl.$^6$ ..................................................... F16B 12/14
[52] U.S. Cl. ....................... 403/408.1; 403/256; 403/401; 411/104; 411/522
[58] Field of Search ............................... 403/405.1, 408.1, 403/401, 23, 231, 245, 256, 257, 252, 247, 254, 104, 106; 411/522, 523, 524, 104, 537, 520, 516, 529; 24/702

[56] References Cited

U.S. PATENT DOCUMENTS

| | | | |
|---|---|---|---|
| 571,042 | 11/1896 | Edquist | 403/257 X |
| 2,468,248 | 12/1949 | Cederquist . | |
| 2,747,638 | 5/1956 | Cederquist | 411/104 |
| 2,815,997 | 3/1957 | Korb . | |
| 3,787,124 | 1/1974 | Burr | 403/408.1 |
| 4,139,316 | 2/1979 | Svensson | 403/231 X |
| 4,514,107 | 4/1985 | Moreno | 403/247 X |
| 4,597,702 | 7/1986 | Brown | 411/529 |
| 4,633,636 | 1/1987 | Alexander | 411/522 X |
| 4,715,626 | 12/1987 | Gehring et al. | 411/427 X |
| 5,647,174 | 7/1997 | Mattarelli | 411/104 X |

FOREIGN PATENT DOCUMENTS

| | | | |
|---|---|---|---|
| 1824536 | 1/1961 | Germany . | |
| 17803 | 10/1919 | Switzerland . | |
| 488075 | 5/1970 | Switzerland | 403/353 |
| 133203 | 5/1919 | United Kingdom . | |

OTHER PUBLICATIONS

German Utility Model No. G 90 10 431.5, Oct. 1990.

*Primary Examiner*—Harry C. Kim
*Attorney, Agent, or Firm*—Brown & Wood, LLP

[57] ABSTRACT

A bolted connection for internally connecting two profiles having holes formed on the respective end surfaces and connecting holes formed perpendicular to and opening into the end surface holes to form a closed passage comprises a fastening rod extendable through the closed passage. The fastening rod is provided with a threaded part which is accessible through one of the connecting holes, a substantially cylindrical retaining part with at least one constriction which is accessible through another of the connecting holes, and a middle part separating the threaded and retaining parts. The bolted connection further comprises a clamping jaw having a slot and a stop fittable into the connecting hole for fitting onto the retaining part to prevent rotation of the fastening rod and a fastening nut fittable into the connecting hole for cooperating with the threaded part to secure the profiles together.

4 Claims, 2 Drawing Sheets

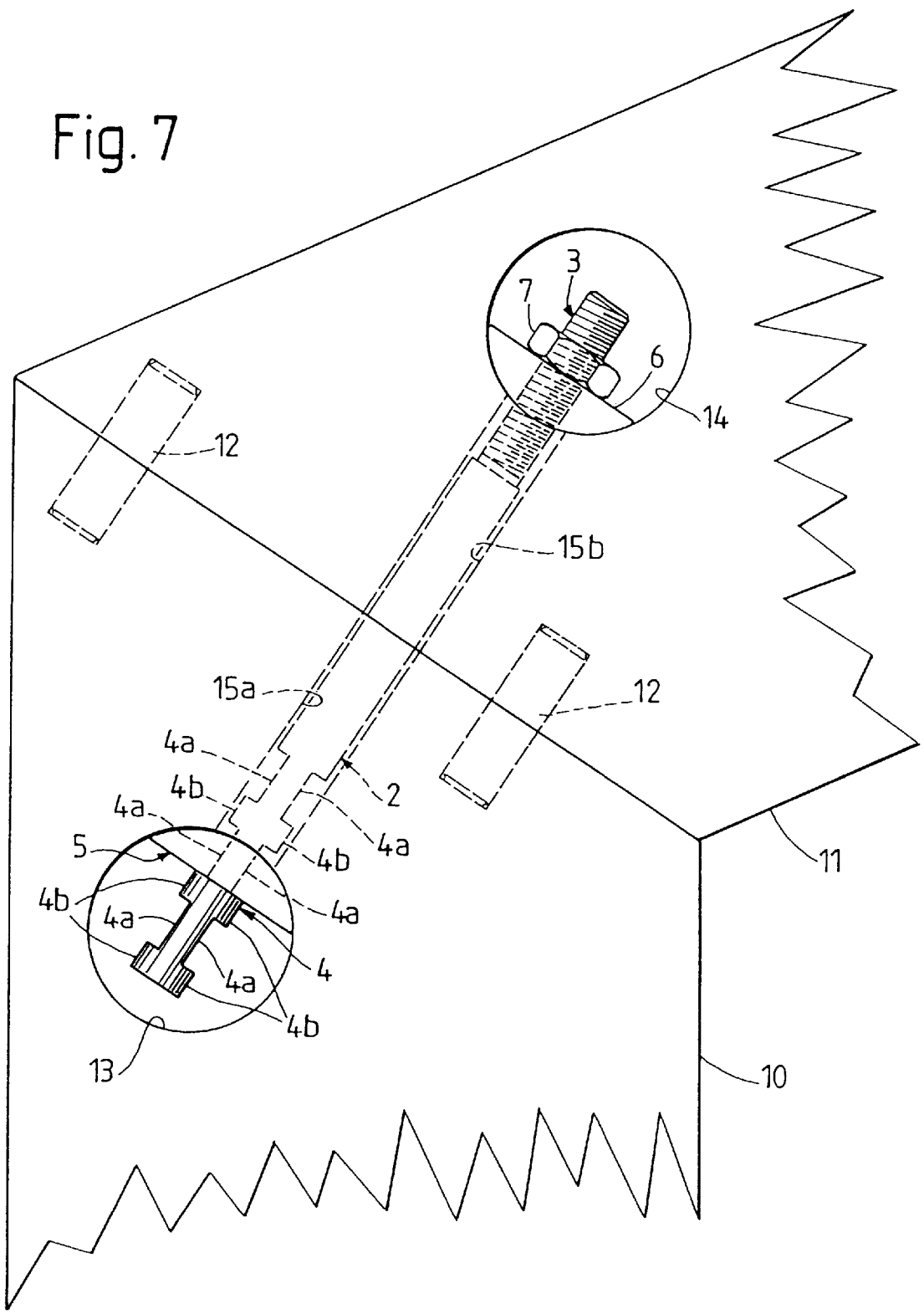

BOLTED CONNECTION FOR CONNECTING TWO PROFILES

BACKGROUND OF THE INVENTION

1. Field of the Invention

The present invention relates to a bolted connection for rigidly connecting a profile to a second profile.

There are many different known embodiments of bolted connections for extensions, corner connections or the like. The bolted connection referred to here is specifically one which is intended for the internal connection of two profiles, for example wooden profiles, which in turn each have a hole in the end surface and a connecting hole opening into this hole and which, in the assembled state, form a passage connecting the two connecting holes to one another.

2. Description of the Prior Art

Known bolted connections for the internal connection of two profiles of the abovementioned type have a fastening rod which is intended for insertion into the stated passage and has two threaded parts each projecting into one of the two connecting holes. In this bolted connection, the profiles are rigidly connected to one another in particular by means of two fastening nuts which fit onto the two threaded parts and serve for detachably connecting the two profiles to one another.

This type of clamping or connection has a substantial disadvantage. Thus, screwing of the two nuts is made more difficult by the fact that, during tightening, one nut must be held with a first wrench while the other nut can be tightened with a second wrench.

SUMMARY OF THE INVENTION

It is an object of the invention to propose a novel bolted connection for the internal connection of two profiles which does not have the abovementioned disadvantage.

This object is achieved by a bolted connection which is intended for the internal connection of two profiles which in turn each have a hole in an end surface and a connecting hole opening perpendicularly into this hole, the two holes in the end surfaces, in the assembled state, together forming a passage which connects the connecting holes to one another, and the bolted connection comprising a fastening rod, capable of being passed through the passage and having a threaded part, and a fastening nut which fits the threaded part. According to the invention, the fastening rod has a middle part intended to rest in the stated passage and dividing the fastening rod into two unequal parts, one of which forms the stated threaded part and the other a retaining part. The latter has at least one constriction for a clamping jaw, which in turn is formed and can be fitted onto the retaining part in such a way that, in the assembled state of the bolted connection, both rotation of the fastening rod and axial displacement of the clamping jaw are prevented.

BRIEF DESCRIPTION OF THE DRAWINGS

An embodiment of the invention is described below with reference to the drawings. In the drawings, FIG. 7 shows two angle profiles connected by means of a bolted connection of the type according to the invention.

DESCRIPTION OF THE PREFERRED EMBODIMENT

Figure 1:
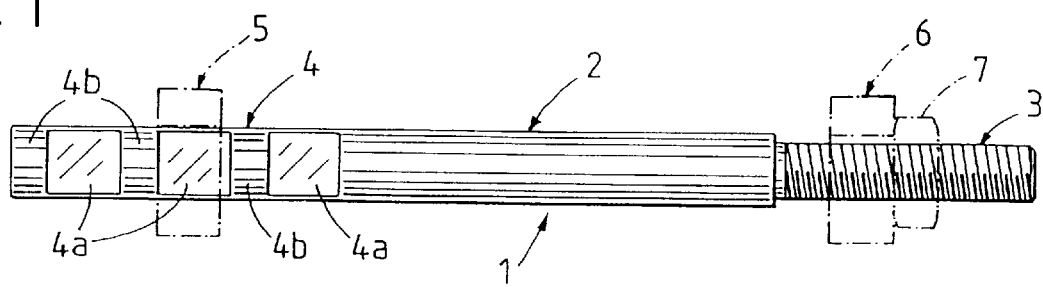
FIG. 1 shows a view, in the direction indicated by the arrow I, of the fastening rod shown in FIG. 2.
Figure 2:
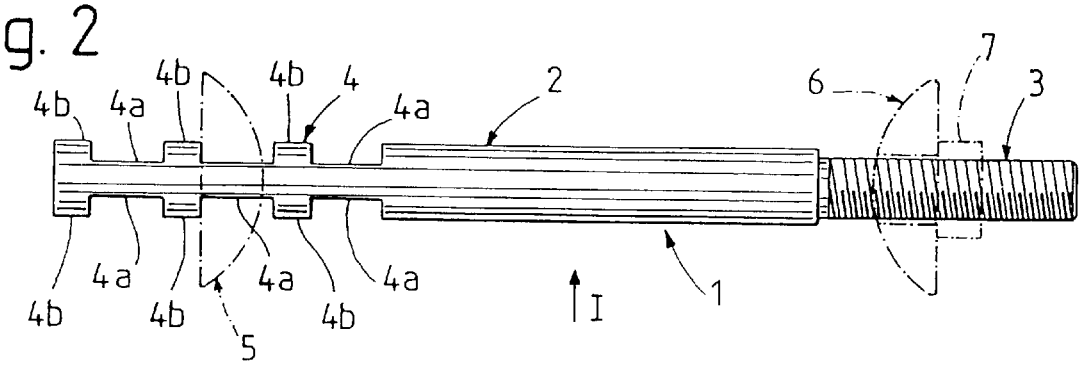
Figure 3:
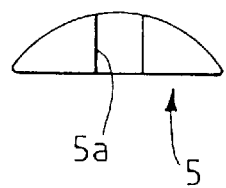
FIG. 3 shows an end view of a first clamping jaw.
Figure 5:
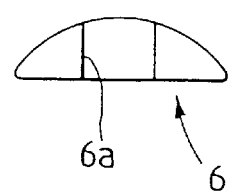
FIG. 5 shows an end view of a second clamping jaw.
Figure 4:
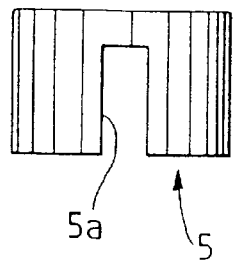
FIG. 4 shows a view of the first clamping jaw in the direction indicated by the arrow IV in FIG. 3.
Figure 6:
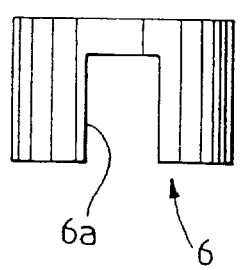
FIG. 6 shows a view of the second clamping jaw in the direction indicated by the arrow VI in FIG. 5

As can be seen from FIGS. 1 to 7, the bolted connection according to the invention consists of four parts, namely of a fastening rod 1 having a middle part 2, a threaded part 3 and a retaining part 4, two clamping jaws 5 and 6 and a nut 7.

The individual parts of the bolted connection which are shown in FIGS. 1 to 6 and drawn in the fastened state in FIG. 7 are formed from a metallic material, preferably from galvanized steel. The fastening rod 1 in turn has essentially a cylindrical shape and consists of an integral metal part.

As can be seen, in particular, in FIG. 7 of the drawings, the bolted connection according to the invention may be inserted, for example, into two angle profiles to be connected to one another, for example wooden angle profiles 10 and 11. For this purpose, the two profiles 10 and 11 have two fastening pegs 12 and each have a hole 15a and 15b, respectively, in their end surface and a connecting hole 13 and 14, respectively, opening perpendicularly into this hole. In the assembled state, the profiles 11 and 12 thus together form a passage which connects the connecting holes 13 and 14 to one another, as also intended for the use of known bolted connections.

The rigid connection of the two profiles 10 and 11 by means of the fastening rod 1 is permitted by the clamping jaws 5 and 6, which can be fitted onto the fastening rod 1, and the nut 7. The bolted connection according to the invention thus permits the use of only one nut. As will be explained below, to prevent the fastening rod 1 from rotating when the nut 7 is turned or slackened, the retaining part 4 is provided with at least one constriction, and one clamping jaw, namely the clamping jaw 5, with a slot 5a fitting the one or more constrictions, so that, in the assembled state of the bolted connection, both rotation of the fastening rod 1 and axial displacement of the clamping jaw 5 are prevented.

The essentially cylindrical retaining part 4 of the embodiment shown has three constrictions 4a, each having two surfaces parallel to one another and to the longitudinal axis of the rod. Here, the constrictions 4a can be produced by cutting out and each have two stops, inter alia, the arc-shaped stops 4b, for preventing axial displacement of the clamping jaw 5.

As already mentioned, the longitudinal slot 5a of the first clamping jaw 5 intermeshes with each constriction 4a, the clamping jaw 5 resting on such a constriction 4a in the fastened state being pressed by the clamping action of the tightened nut 7 against the inner wall of the connecting hole 13 and being clamped by this and the outer stop 4b of the corresponding constriction 4a.

Since the slot 5a of the clamping jaw 5 fits the smaller longitudinal section of the constrictions 4a, the clamping jaw 5 can be nonrotatably fitted onto the retaining part 4. Since moreover the retaining part 4 has three constrictions 4a, it is also possible—independently of the length of the hole 15a or 15b—to connect differently dimensioned profiles to one another by means of the bolted connection according to the invention.

As a result of the design described above, the bolted connection according to the invention does not have the disadvantage of known bolted connections which was described at the outset. Thus, tightening the bolted connection with only one nut is substantially easier than screwing it together with two nuts.

In order to connect the two profiles 10 and 11 by means of the bolted connection according to the invention, the following procedure is followed: first, the fastening rod 1 is inserted into an end hole 15a or 15b. The two profiles 10 and 11 are then assembled with the aid of the pegs 12 and the appropriate holes in such a way that the two end holes 15a and 15b form the stated passage. The clamping jaw 5 is then inserted into the connecting hole into which the retaining part 4 projects, i.e., in the embodiment shown here, into the connecting hole 13, this being performed in such a way that, in the assembled state, that outer surface of the clamping jaw 5 which fits the connecting hole 13 is directed toward the inner wall of the hole 13. As a result of this comb-like intermeshing of retaining part 4 and clamping jaw 5, the fastening rod 1 is now held so firmly that it can no longer rotate about its longitudinal axis. Thereafter, the clamping jaw 6 is fitted onto the threaded part 3 projecting into the connecting hole 15 and is screwed down with the nut 7, here too the clamping jaw 6 being provided with a slot 6a—in this case one which fits the threaded part 3—and an outer surface which fits the connecting hole 14. When the nut 7 is tightened, the two clamping jaws 5 and 6 are pressed tightly against the inner walls of the connecting holes 13 and 14, and the clamping jaw 5 is additionally clamped by two stops 4b and the connecting hole 13, so that the two profiles 10 and 11 are thus rigidly connected.

Finally, it should also be pointed out here that the bolted connection described with reference to FIGS. 1 to 7 represents only one choice from a plurality of possible embodiments of the invention and can be modified in various respects.

Thus, the dimensions of both the individual parts of the fastening rod and of the clamping jaws can be modified optionally and as a function of the dimensions of the end holes and connecting holes of the profiles to be connected to one another. It is also possible to use clamping jaws made of plastic instead of metallic clamping jaws, or to use a washer instead of the clamping jaw 6 which fits the threaded part, provided that this is permitted by the geometry of the connecting hole.

Moreover, the threaded part may additionally be provided with a conical head tapering outward, which facilitates the placing of the nut on the thread.

Finally, instead of having only three constrictions or cut-outs, the retaining part of the fastening rod may also have more or less, for example one, two, four, five or six constrictions or cut-outs.

What is claimed is:

1. A bolted connection for internally connecting two profiles each of which has an end surface, a hole formed in the end surface, and a connecting hole extending substantially perpendicular to the hole formed in the end surface and opening into the hole formed in the end surface, the end surface holes of the two profiles forming, in an assembled condition, a closed passage which connects the connecting holes of the two profiles, the bolted connection comprising:

a fastening rod extendable through the passage and having a threaded part, a substantially cylindrical retaining part and a middle part separating the threaded and retaining parts, with the threaded part being accessible through the connecting hole formed in one of the two profiles, the retaining part being accessible through the connecting hole formed in another of the two profiles, and the middle part being located in the passage when the fastening rod extends through the passage, the retaining part having at least one constriction which has two spaced parallel surfaces;

a clamping jaw fittable into the connecting hole through which the retaining part of the fastening rod is accessible for fitting onto the retaining part and having a slot enabling fitting of the clamping jaw onto said at least one constriction of the retaining part and a surface engageable with a surface of the connecting hole through which the retaining part is accessible, the retaining part having at least one stop for preventing axial displacement of the clamping jaw when it is fitted on the retaining part whereby rotation of the fastening rod is also prevented; and a fastening nut fittable into the connecting hole through which the threaded part is accessible and cooperating with the threaded part for securing the two profiles together.

2. A bolted connection as claimed in claim 1, wherein the slot of the clamping jaw fits on a longitudinal section of the constriction extending between the two spaced parallel surfaces.

3. A bolted connection as claimed in claim 1, wherein the retaining part has three constrictions.

4. A bolted connection as claimed in claim 1, further comprising a further clamping jaw for fitting onto the threaded part.

\* \* \* \* \*